United States Patent
Kawaguchi (10) Patent No.: US 9,434,022 B2
(45) Date of Patent: Sep. 6, 2016

(54) HOLLOW COMPONENT, A METHOD OF MANUFACTURING THE SAME, AND AN APPARATUS FOR MANUFACTURING THE SAME

(75) Inventor: Shuichiro Kawaguchi, Yokohama (JP)

(73) Assignee: Yorozu Corporation, Yokohama (JP)

( * ) Notice: Subject to any disclaimer, the term of this patent is extended or adjusted under 35 U.S.C. 154(b) by 352 days.

(21) Appl. No.: 14/005,027

(22) PCT Filed: Mar. 14, 2012

(86) PCT No.: PCT/JP2012/056575
§ 371 (c)(1),
(2), (4) Date: Nov. 21, 2013

(87) PCT Pub. No.: WO2012/124735
PCT Pub. Date: Sep. 20, 2012

(65) Prior Publication Data
US 2014/0069227 A1    Mar. 13, 2014

(30) Foreign Application Priority Data
Mar. 14, 2011 (JP) .................................. 2011-055478

(51) Int. Cl.
*B23K 20/12* (2006.01)
*B60T 7/06* (2006.01)
(Continued)

(52) U.S. Cl.
CPC .............. *B23K 20/12* (2013.01); *B21J 5/063* (2013.01); *B21J 5/066* (2013.01); *B23K 31/02* (2013.01); *B60T 7/06* (2013.01); *G05G 1/30* (2013.01); *B23K 2201/006* (2013.01); *B23K 2201/18* (2013.01); *Y10T 74/20888* (2015.01)

(58) Field of Classification Search
CPC ................................................ Y10T 74/20888
USPC ..................................................... 74/512, 560
See application file for complete search history.

(56) References Cited

U.S. PATENT DOCUMENTS 3,989,919 A * 11/1976 Wefers ................ B23K 11/163
219/92
6,216,344 B1    4/2001 Mercat et al.
(Continued)

FOREIGN PATENT DOCUMENTS

DE           4322632 A1    1/1995
EP           0633132 A1    1/1995
(Continued)

OTHER PUBLICATIONS

EPO Machine Translation of DE4322632, Gerhardt, Jan. 1995.*
(Continued)

*Primary Examiner* — Vinh Luong
(74) *Attorney, Agent, or Firm* — Drinker Biddle & Reath LLP (57) ABSTRACT

A hollow component made of thin sheet metal members is described, along with a method of manufacturing such hollow component. The method involves applying a flow drilling process on one sheet metal member of a pair of sheet metal members having a gap G between them to form a first collar part. A flow drilling process is applied on the other sheet metal member of the pair to form a second collar part as well as to cause an inner tip of the second collar part to fuse with an inner tip of the first collar part. A cylindrical connection member is formed to strengthen a flat sheet metal members.

2 Claims, 7 Drawing Sheets

(51) Int. Cl.
  *B21J 5/06*    (2006.01)
  *G05G 1/30*    (2008.04)
  *B23K 31/02*   (2006.01)

(56) References Cited

U.S. PATENT DOCUMENTS

| | | | |
|---|---|---|---|
| 8,567,283 B2 | 10/2013 | Himetani et al. | |
| 2003/0029267 A1 | 2/2003 | Aoki et al. | |
| 2010/0058887 A1* | 3/2010 | Fujita | B60K 23/02 74/512 |
| 2010/0180717 A1* | 7/2010 | Himetani | G05G 1/46 74/560 |
| 2010/0307284 A1 | 12/2010 | Himetani et al. | |
| 2011/0252919 A1* | 10/2011 | Nagahori | B21D 53/88 74/594.4 |
| 2015/0355670 A1* | 12/2015 | Ishizuki | B60T 7/06 74/560 |

FOREIGN PATENT DOCUMENTS

| | | | |
|---|---|---|---|
| EP | 0743111 A1 | 11/1996 | |
| JP | 3892653 B2 | 3/2007 | |
| JP | 2009181442 A | 8/2009 | |
| JP | 2010-247757 * | 11/2010 | B23K 20/12 |
| WO | WO-2009096047 A1 | 8/2009 | |

OTHER PUBLICATIONS

J-Dial-Pat Machine Translation of JP 2010-247757, Ueno, Nov. 2010.*

International Search Report for PCT/JP2012/056575 mailed May 29, 2012.

Extended European Search Report for EP 12757209 dated Oct. 5, 2015.

* cited by examiner

HOLLOW COMPONENT, A METHOD OF MANUFACTURING THE SAME, AND AN APPARATUS FOR MANUFACTURING THE SAME

CROSS-REFERENCE TO RELATED APPLICATIONS

This application is a national stage application (under 35 U.S.C. §371) of PCT/JP2012/056575, filed Mar. 14, 2012, which claims benefit of Japanese Patent Application No. 2011-055478, filed Mar. 14, 2011. Both of the aforementioned applications are incorporated herein by reference.

TECHNICAL FIELD

The present invention relates to a hollow component formed by a flow drilling process, a method of manufacturing the same, and an apparatus for manufacturing the same.

BACKGROUND TECHNOLOGY

Among various automobile components, a few of them are made from a pair of sheet metal parts connected together and positioned to oppose with each other, e.g., brake pedals used for brake pedal systems of automobiles. Brake pedals of these days are often used as hollow components in order to make them lighter in weight, comprising a pair of sheet metal parts that are positioned to oppose with each other and connected at their fringe areas.

A conventional brake pedal system of automobiles comprises: a bracket attached to the dashboard panel; a brake pedal whose top portion is mounted on a support shaft which is rotatably mounted on the bracket; and a rod one end of which is connected to a pin that goes through the top area of the brake pedal, while the other end is connected to master vac (not shown) (see, for example, Patent Document 1 below).

In such a brake pedal system, stepping on the brake pedal causes the stepping force to be transmitted to the master vac via the connecting part between said brake pedal and the rod, resulting in a large force being applied to the connecting part. Therefore, the connecting part has hitherto been so constructed as to have a sufficient strength by piercing a prepared hole in the brake pedal, welding a pipe to said prepared hole, inserting a pin into the pipe, and connecting the end of the rod to the pin. The manufacture of such a brake pedal requires the prepared hole machining of the brake pedal and welding of the pipe, so that it is not only undesirable from the cost standpoint due to the cost of the pipe and welding cost, but also from the standpoint of man-hour and work environment.

Therefore, due to the demands for weight reduction of vehicle components in general, brake pedals have come to be manufactured lately by assembling a pair of preformed thin sheet metal parts together to form a hollow body and bending the peripheral edge to connect them together. Such a brake pedal is lighter in weight because it is generally hollow in shape, does not require any welding as it is assembled by press-forming the peripheral edge, and causes a desirable work environment.

PRIOR ART DOCUMENTS

Patent Document

[Patent Document 1] Publication No. JP, 3892653 B.

SUMMARY

Problems to be Solved by the Invention

However, such a brake pedal presented a concern on the strength of the connecting part between the brake pedal and the rod as the pedal is formed from thin sheet metal parts, as well as other concerns such as being incapable of fully satisfy the weight reduction needs and causes an undesirable work environment because of the welding of the pipe there.

The present invention is intended to solve such problems of the prior art described above by providing a hollow component, a method of manufacturing and an apparatus for manufacturing the same, which can be formed from thin sheet metal members, presents no concerns on its strength, is advantageous from the cost standpoint, and is no problem with the work environment.

Means for Solving Problems

An aspect of the present invention in order to achieve the above-mentioned objective is a hollow component formed by joining and connecting together a pair of preformed sheet metal members to produce a hollow structure, comprising: a first collar part formed by applying a flow drilling process inwardly from an outside of one of said sheet metal members; and a second collar part formed by applying a flow drilling process inwardly from an outside of the other of said sheet metal members, wherein a cylindrical connection member is formed to connect said first sheet metal member and second sheet metal member by causing an inner tip of said first collar part and an inner tip of said second collar part to fuse together.

Another aspect of the present invention in order to achieve the above-mentioned objective is a method of manufacturing a hollow component formed by joining and connecting together a pair of preformed sheet metal members to produce a hollow structure, comprising: a first hole drilling process for opening a hole by pressing a flow drill while rotating the flow drill on one of the sheet metal members placed across a gap each other from a direction perpendicular to a surface of said one of the sheet metal members in the inward direction, and simultaneously forming a first collar part on an inner circumference of the hole; a process of retracting said flow drill to be away from the hole it has opened; and a second hole drilling process for opening a hole on the other of said sheet metal members at a location that opposes said hole by pressing the flow drill while rotating the flow drill on said the other sheet metal member from a direction perpendicular to a surface of said the other of the sheet metal members in the inward direction, and simultaneously forming a second collar part on an inner circumference of the hole as well as forming a cylindrical connection member by causing an inner tip of the second collar part and an inner tip of the first collar part to fuse together.

Yet another aspect of the present invention in order to achieve the above-mentioned objective is an apparatus for manufacturing a hollow component formed by joining and connecting together a pair of preformed sheet metal members to produce a hollow structure, comprising: at least a pair of main spindles facing each other across a flat table of a drill press located concentrically to each other; a first flow drill mounted on one of said spindles to apply a first hole drilling process on one of said sheet metal members having a gap between them, while forming a first collar part simultaneously; and a second flow drill mounted on the other of said spindles to apply a second hole drilling process on the other of said sheet metal members, while forming a second collar part simultaneously; wherein an inner tip of said second collar part is caused to fuse with an inner tip of said first collar part to form a cylindrical connection member for connecting said two sheet metal members.

Effect of the Invention

According to the present invention, the inner tip of the first collar part of one of the sheet metal members formed by the flow drilling process and the inner tip of the second collar part of the other of said sheet metal members formed similarly are fused together to form the cylindrical connection member in connecting the two sheet metal members, so that although the light-weight hollow member is formed from the thin sheet metal members it is reinforced by the cylindrical connection member thus achieving an excellent sturdiness as the cylindrical connection member serving like a pipe, and in the manufacturing process, it eliminated the need of pipe welding, making it a more desirable process from the material cost, man-hour, and work environment standpoints.

The hollow component is preferably a brake pedal formed to connect an end of a rod with a master vac and an other end of the rod with a protruding end of a pin member that is inserted into the cylindrical connection member. As such, even though it is the brake pedal constructed from thin sheet metal members, it can be a light-weighted brake pedal with an excellent strength as a connection part of the rod is reinforced by said cylindrical connection member, while requiring no need of welding a pipe to the connection part.

More specifically, in a hollow component such as a hollow brake pedal formed by joining a pair of press-formed thin sheet metal members end to end and connecting peripheral edges by a process such as hemming, it can be made to withstand a large force applied to the brake pedal by providing a higher strength to the entire sheet metal member by further connecting the pair of thin sheet metal members via the cylindrical connection member protruding inwardly from the surface of each of the sheet metal members. In particular, while some of the brake pedals are three-dimensionally curved, even those brake pedals can be prevented from developing distortions and deformations even, when they are subjected to large forces during brake operations thanks to the internal connection provided by the cylindrical connection member.

Furthermore, while extremely large forces may be applied to the portion of the brake pedal that connects with the master vac when the brake is operated, it is possible to make a light-weight high strength brake pedal by providing the cylindrical connection member at the particular portion and insert a pin in the inside thereof to make it connect with the rod extending from the master vac side, thus causing the cylindrical connection member to reinforce the portion where the highest stress occurs.

According to the hollow component manufacturing method of the present invention, the inner tip of each collar part of the pair of sheet metal members formed by applying the flow drilling process from the opposite directions is made to fuse with each other to form the cylindrical connection member, so that the cylindrical connection member can be easily formed and the two sheet metal members can be connected via the cylindrical member. Moreover, the strength of the thin and flat sheet metal members can be enhanced substantially by means of such the cylindrical connection member, so that its application to the hollow component which requires a high strength is extremely effective.

According to the apparatus for manufacturing the hollow component according to the present invention, in particular to the invention of claim 4, the first flow drill and the second flow drill are mounted on a pair of spindles placed concentric with the center line of the table of a drill press to apply the flow-drilling process to a hollow workpiece consisting of a pair of sheet metal members, so as to cause the inner tip of each collar part to fuse each other to form the cylindrical connection member that connects said pair of sheet metal members, thus constituting a flow-drilling equipment extremely easily for applying a flow-drilling operation from the top and bottom of the workpiece, hence achieving excellent work efficiency and high cost efficiency.

The objects, features, and characteristics of this invention other than those set forth above will become apparent from the description given herein below with reference to preferred embodiments illustrated in the accompanying drawings.

WORKING EXAMPLE OF INVENTION

The embodiments of the present invention will be described in detail below with reference to the accompanying drawings.

An automotive component related to the present embodiment is, for example, a brake pedal to be used for a brake pedal system. The brake pedal system typically comprises, as shown in FIG. 1, a bracket 2 attached to the dashboard panel 1, a brake pedal 4 whose top portion is mounted on a support shaft 3 which is rotatably mounted on the bracket 2, a pin 5 that goes through the top part of the braked pedal 4, and a rod 6 one end of which is connected to the pin 5 while an other end of which is connected to master vac (not shown).

Figure 1:
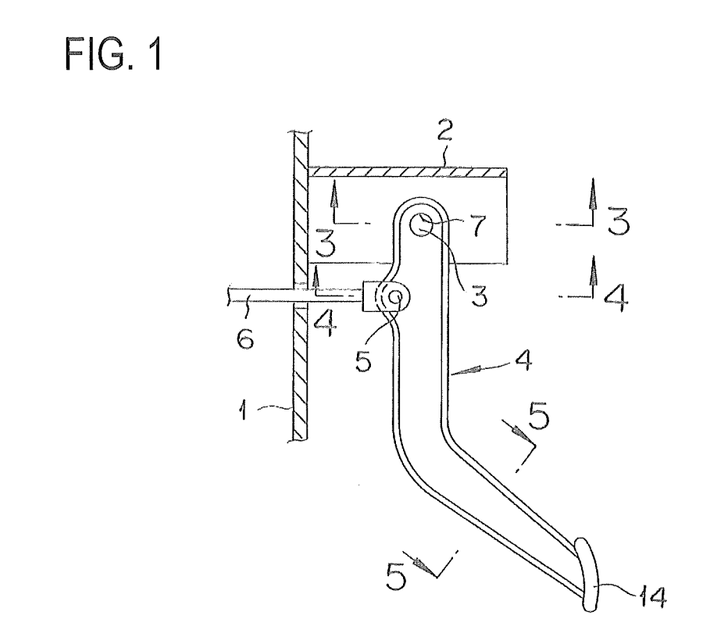
FIG. 1 is a schematic side view showing an example of brake pedal system according to an embodiment of the present invention.
Figure 2:
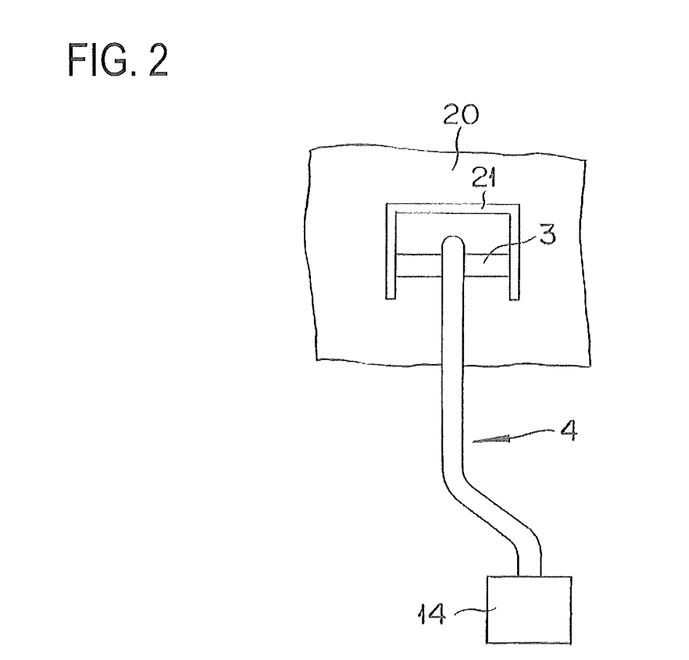
FIG. 2 is a schematic front view of the brake pedal system.

The brake pedal 4 is formed by press-forming a thin sheet metal member in order to reduce the weight, and is curved three dimensionally as shown in FIGS. 1 and 2. The brake pedal 4 is a hollow component made by press-forming a pair of sheet metal members 20 and 21 which are preformed independently or two sheet metal members 20 and 21 connected together as a unit to form a hollow structure by joining a pair of press-formed thin sheet metal members end to end and connecting peripheral edges by a process such as hemming as shown in FIG. 3-5.

Figure 3:
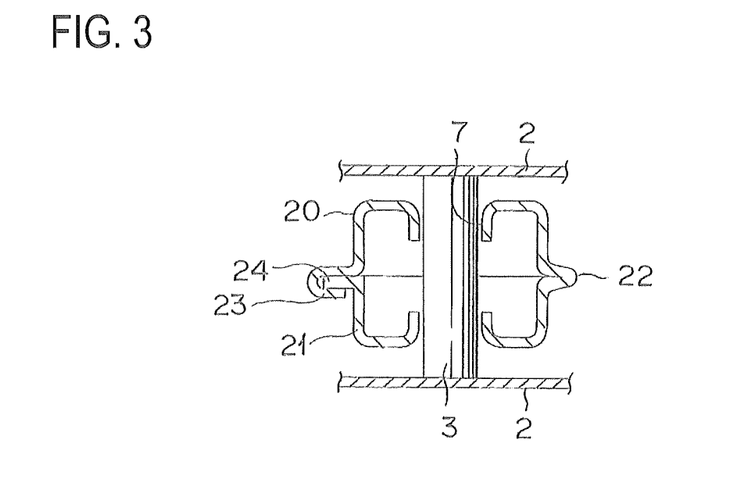
FIG. 3 is a cross-sectional view taken on line 3-3 of FIG. 1.

For example, the upper end part of the brake pedal 4 is formed as shown in FIG. 3 by bending the pair of sheet metal members 20 and 21 having a support communicating hole 7 about the folding part 22 so that they are joined end to end, then press-forming one of the peripheral edges 23 over another peripheral edge 24 by hemming, and causing a support shaft 3 provided between the bracket 2 pass through an inside of the communicating hole 7. It goes without saying that the connection between the two sheet metal members 20 and 21 does not have to be limited to a bending process such as hemming.

Figure 4:
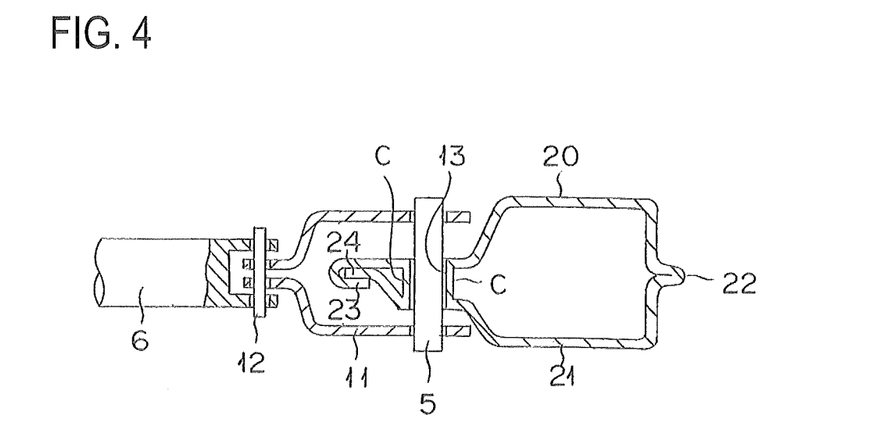
FIG. 4 is a cross-sectional view taken on line 4-4 of FIG. 1.
Figure 5:
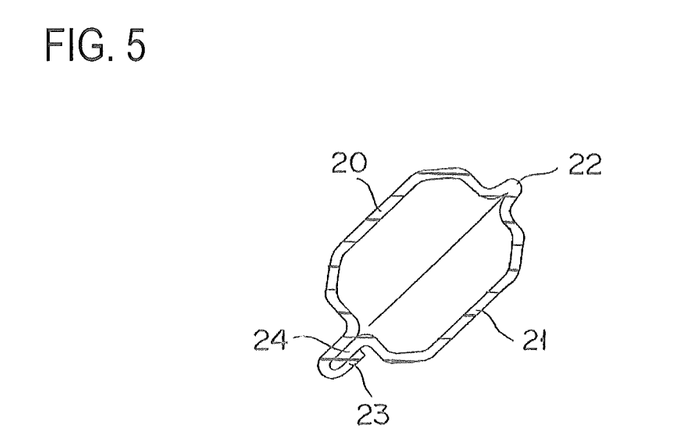
FIG. 5 is a cross-sectional view taken on line 5-5 of FIG. 1.

The top portion of the brake pedal 4 is connected to a connecting member 11 provided with an end of the rod 6 via the pin 5 as shown in FIG. 4. This connecting part is generally called a clevis part, and the pair of sheet metal members 20 and 21 are provided with a clevis communicating hole 13 through which the pin 5 is inserted.

In case of the brake pedal 4 of the present embodiment particularly, the clevis communicating hole 13 is formed with a cylindrical connection member C that connects the sheet metal members 20 and 21 by welding an inner tip of a first collar part C1 formed by applying the flow drilling process from the outside of the sheet metal member 20 toward inside and an inner tip of a second collar part C2 formed by applying the flow drilling process from the outside of the sheet metal member 21 toward inside. The flow drilling process is described in detail later.

Since the clevis communicating hole 13 is subjected to large forces, it is possible to produce a light-weighted but very strong brake pedal by means of a simple process, forming the cylindrical communication member C that extends from the surface of the hollow component to inward by the flow drilling operation in forming the pair of sheet metal members 20 and 21, where the cylindrical connection member serves as the reinforcement member of the hollow braked pedal 4.

The bottom part of the brake pedal 4 is also formed as shown in FIG. 5 by bending the pair of sheet members 20 and 21 about the folding part 22 so that they are joined end to end, then press-form one of the peripheral edges 23 over another peripheral edge 24 by hemming, while the bottom ends of the pair of sheet metal members 20 and 21 are formed to produce a foot board 14.

Next, the method of manufacturing a hollow component according to the present embodiment and its manufacturing apparatus are described. The brake pedal 4 is essentially manufactured by applying the flow drilling process to a hollow workpiece W formed by connecting pair of sheet metal members 20 and 21 which are preformed by a press forming process. The flow drilling process is a process of piercing a hole on the sheet metal and simultaneously forming a collar part C by pressuring a flow drill D that is rotating at a high speed in a direction perpendicular to the surface of the sheet metal member 20 or 21.

Figure 6:
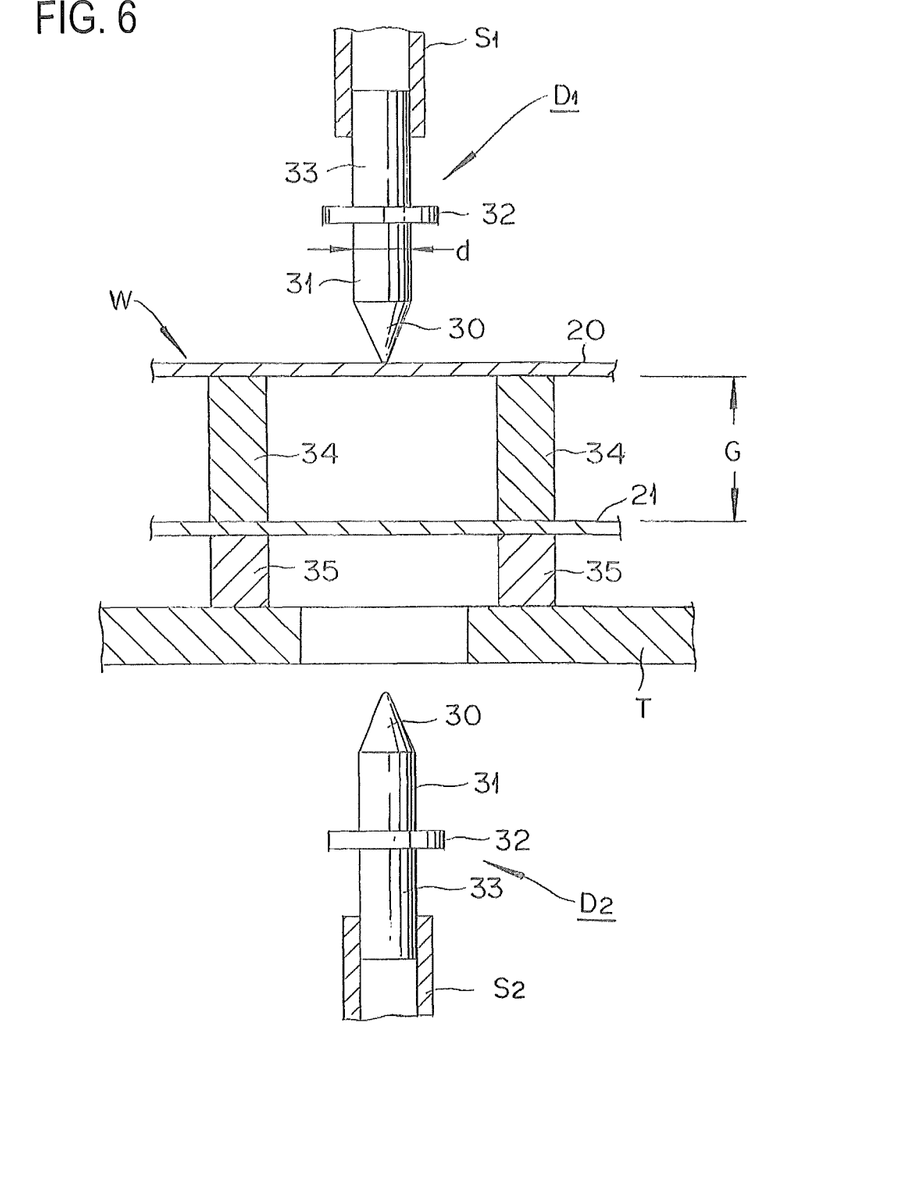
FIG. 6 is a cross-sectional view showing a status of a manufacturing apparatus according to the embodiment of the invention prior to the flow drilling process.
Figure 10:
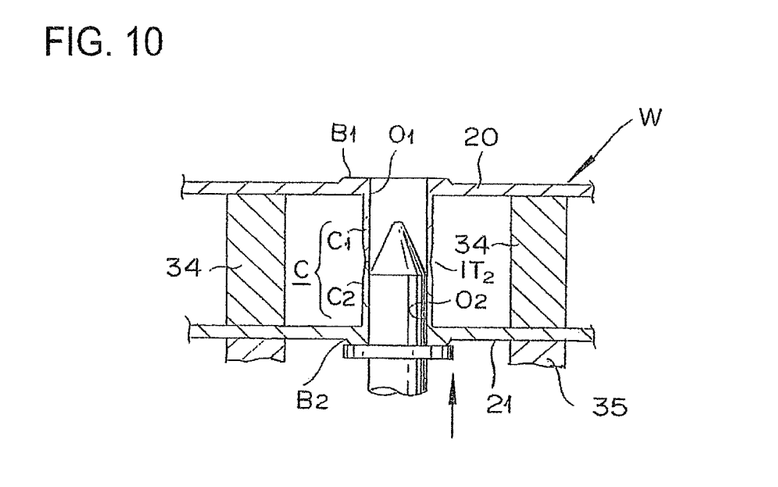
FIG. 10 is a cross-sectional view of major parts during the second hole drilling process.

More specifically, as shown in FIG. 6, while the workpiece W consisting of the two sheet metal members 20 and 21 is placed on a table T, the flow drill D is used to execute a first hole drilling process from a top side of the two sheet metal member 20 and 21, forming the first collar part C1, and then the flow drill D is used similarly to execute a second hole drilling process from the bottom side, forming the second collar part C2. In the present embodiment, in particular, the inner tips IT1 and IT2 of the first collar part C1 and the second collar part C2 are caused to fuse together during the second hole drilling process so as to form the cylindrical connection member C that connects the sheet metal members 20 and 21 together in order to strengthen the sheet metal members 20 and 21 as shown in FIG. 10.

A further detail description follows. The manufacturing apparatus according to the present embodiment is based on the drill press, as shown in FIG. 6, comprising: the flat table T on which the hollow workpiece W is placed, a pair of spindles S concentrically placed across the table T opposing with each other, a first flow drill D1 mounted on the bottom end of an upper spindle S1 via a chuck, etc., for providing the first drilling process to the workpiece W to form the first collar part C1, and a second flow drill D2 mounted on a top end of a lower spindle S2 via the chuck, etc., for providing the second drilling process to the workpiece W to form the second collar part C2. Since the drill press is used to constitute the manufacturing apparatus, there is no need for a special purpose machine so that it is very cost effective.

The flow drill D consists of a conical nose part 30, a straight part 31 that follows the conical nose part 30, a flange part 32 that is larger in diameter than the straight part 31, and a shank part 33 having the same diameter as the straight part 31 as shown in FIG. 6, and made of heat resistant materials such as tungsten carbide On the other hand, when it is before the sheet metal members 20 and 21 are connected together, the workpiece W consisting of the sheet metal members 20 and 21 has spacers 34 placed between the two sheet metal members 20 and 21 so that they can be placed across a gap G and parallel with each other, and is placed horizontally on the table T supported by supporting members 35 as shown in FIG. 6. The spacer 34 should preferably be placed at a position that minimizes the deflections of the sheet metal members 20 and 21 when they are pressured by the flow drills D. When the two sheet metal members 20 and 21 are united beforehand, there is no need to use the spacers 34 as the supporting members 35 can support them.

First, the first drilling process is executed as follows. In the first drilling process, the first flow drill D1 is brought down while it is rotating at high speeds in a direction perpendicular to the sheet metal while applying pressure to the top sheet metal member 20 with the nose part 30. As a pressure is applied between the nose part 30 having a radius tip and the sheet metal member 20, friction heat is generated. As this friction heat cause softening of the sheet metal member 20 locally, its area of contact with the first flow drill D1 gradually increases due to the softening. Since the nose part 30 is tapered on the outside, its gradual downward motion in accordance with the softening of the sheet metal member 20 further increases the contact area between the sheet metal member 20 and the first flow drill D1 and the softened part expands in a radial direction.

Figure 7:
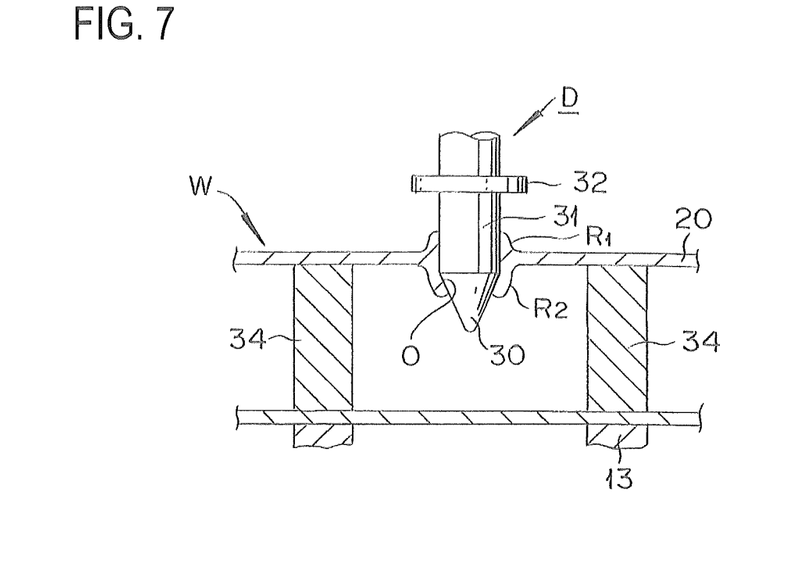
FIG. 7 is a cross-sectional view of major parts after the start of the flow drilling process.

The softened part eventually gets broken through by the nose part 30 and becomes widened by the straight part 31 that follows the nose part 30 as shown in FIG. 7. While the nose part 30 is substantially cone-shaped, the cross-section shape perpendicular to an axis is not a simple circle but rather a triangular or rectangular-shape with rounded corners, so that the drill can continue to drill without fusing with the sheet metal although it is rotating at a high speed. As a result, a first hole O1 is opened, and also protruding parts R1 and R2 are formed above and below the sheet metal member 20 along the first flow drill D1.

Figure 8:
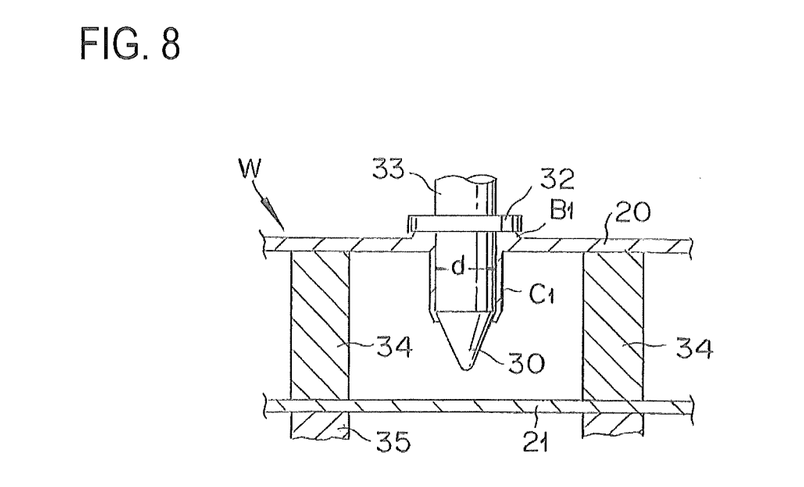
FIG. 8 is a cross-sectional view of major parts at the completion of the first hole drilling process.

As the first flow drill D1 goes down further, the first hole O1 comes to have the diameter that corresponds to the shaft diameter d of the straight part 31 that follows the nose part 30 as shown in FIG. 8, while the upper protruding part R1 is compressed by the flange part 32 of the first flow drill D1 to form a flat first boss part B1, and the lower protruding part R2 becomes the first collar part C1 that extends along the axial direction along the outer surface of the straight part 31. With the formation of the first collar part C1 and the like, the first hole drilling process is completed.

The process using the flow drill D not only has an advantage of generating no cutting chips in creating a hole, but also has another advantage of creating a protrusion forming of a collar part from an inner edge part of the hole opened by the friction heat.

Figure 9:
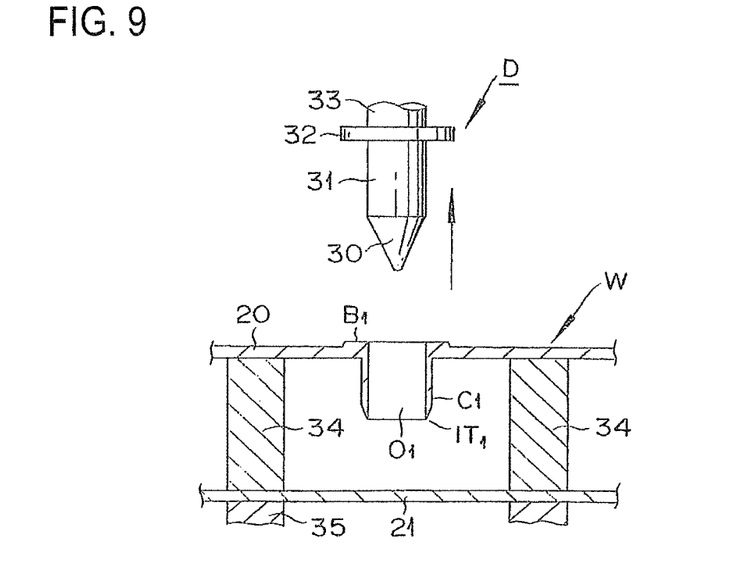
FIG. 9 is a cross-sectional view of major parts during the flow drill retraction process of the flow drilling process.

Next, the first flow drill D1 is retracted from the first hole O1 which has just been opened to an original position as shown in FIG. 9.

The second hole drilling process is then started next. As shown in FIG. 10, the second hole drilling process is executed to drill a hole in the sheet metal member 21 by raising the second flow drill D2 that is place below, but it is essentially the same as the first hole drilling process. The position which the second flow drill D2 applies pressure is the opposite position where the first hole O1 is formed. In this case, the second flow drill D2 that is rotating at high speeds applies pressure against the sheet metal member 21 in a direction perpendicular to the surface of the sheet metal member 21. As a result, a second boss part B2, a second hole O2, and the second collar part C2 are formed similar to those in the case of the first hole drilling process as shown in FIG. 10.

However, during the growth process of the second collar part C2, its inner tip part IT2 gets fused to the inner tip IT1 of the first collar part C1. Since the gap G between the top and bottom sheet metal member 20 and 21 as well as the diameter of the flow drill are set to specific values, the length of the second collar part C2 becomes such that it approximately reaches the inner tip of the first collar part C1. Since the inner tip of the second collar part C2 is further advanced from a softened state to a kind of molten state so that, when the inner tip IT2 of the second collar part C2 makes contact with the inner tip IT1 of the first collar part C1, a fusion process occurs between them, thus connecting the first collar part C1 with the second collar part C2 in one piece. Consequently, the top and bottom sheet metal members 20 and 21 come to be solidly connected via the cylindrical connection member C, thus substantially increasing the strength.

The use of the flow drills D1 and D2 located above and below to execute the drilling operation eliminates the need of overturning the workpiece W, thus making the process speedier, and more suitable for automation and mass production. However, the present invention is not to be construed to be limited to this and it goes without saying that the drilling operation can be done on the workpiece W consisting of the pair of sheet metal members 20 and 21 by turning it over on the table T.

Lastly, the entire process is completed as the second flow drill D2 is retracted from the second hole O2 which has just been opened to an original position.

Figure 11:
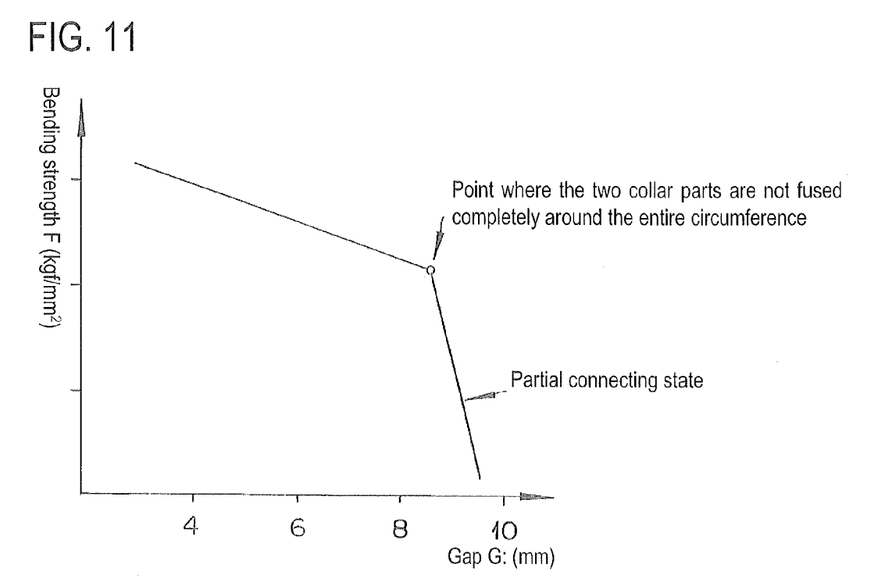
FIG. 11 is a graph showing the relation between the bending strength and the gap.

At this point, an experiment was conducted to study the bending strength F of the two sheet metal members 20 and 21 connected by the cylindrical connection member C and the gap G between the two sheet metal members 20 and 21, the result of which is shown in FIG. 11.

The flow drill D with a drill diameter of 8 mm was used to drill holes on the workpiece consisting of steel sheet metal members 20 and 21 with 1.60 mm thickness, which are connected together by the hemming process to form the hollow shape. Four kinds of gaps G between the sheet metal member 20 and 21, 2.8 mm, 4.8 mm, 6.8 mm, and 8.8 mm, were used for comparison purpose.

While the bending strength varied with the size of the gap G, the inner tips of the first collar part C1 and the second collar part C2 were fused together all around the entire circumference to form the cylindrical connection member C in cases when the gap G was 2.8 mm, 4.8 mm and 6.8 mm, the inner tips of the collar parts C1 and C2 were not completed fused in case the gap G was 8.8 mm.

It was learned that the bending strength F was relatively good when the two sheet metal members 20 and 21 are connected by the cylindrical connection member C regardless of the size of the gap G, but the bending strength F sharply reduces when the inner tips of the two collar parts C1 and C2 are not connected completely around the entire circumference as in the case of the gap G is 8.8 mm or when the connection is made only partially.

According to this experiment, the benefits in manufacturing the hollow component can be greatly improved by selecting the gap G between the two sheet metal members 20 and 21 in accordance with the required bending strength F, or selecting the proper sheet metal members 20 and 21 that provide the the required bending strength F if the gap G between the two sheet metal members 20 and 21 is specified.

The invention should not be construed to be limited to the embodiment described above, but also rather to be capable of being modified in various ways by a person skilled in the art within the scope of the technological idea of the present invention. For example, although the brake pedal for a vehicle is used as an example to describe the above embodiment, the present invention is not limited to it, but rather it is applicable to various hollow components such as side brake pedals, various hollow members and frames. Moreover, although the flow drilling process is applied to the pair of sheet metal members with the same thickness in the above embodiment, the invention can be applied to a case where the sheet metal members are of different thicknesses or where multiple sheet metal members are involved. Furthermore, although the cylindrical connection member C is formed on the clevis communicating hole 13, the cylindrical connection member C can be formed on the support communicating hole 7 at the top of the brake pedal 4.

INDUSTRIAL APPLICABILITY

The present embodiment is suitably used on hollow components providing high strengths.

The present application is based on the Japanese Patent Application No. 2011-055478 filed on Mar. 14, 2011, the disclosure content thereof is referenced here and made apart of hereof as a whole.

DESCRIPTION OF THE CODES 20, 21 Sheet metal members
C Cylindrical connection member
C1 First collar part
C2 Second collar part
D Flow drill
D1 First flow drill
D2 Second flow drill
G Gap O Hole
S1 First spindle
S2 Second spindle
T Table

The invention claimed is:

1. A hollow component formed by joining and connecting together a first sheet metal member and a second sheet metal member in a process comprising:
   forming a first collar part by applying a flow drilling process inwardly from an outside of said first sheet metal member;
   forming a second collar part by applying the flow drilling process inwardly from an outside of the said second sheet metal member;
   fusing together a first inner tip of the first collar part and a second inner tip of the second collar part, when the second collar part is formed, to form a cylindrical connection member that connects said first sheet metal member and second sheet metal member.

2. The hollow component according to claim 1, where said hollow component is a brake pedal formed to connect an end of a rod with a master vac and an other end of the rod with a protruding end of a pin member that is inserted into the cylindrical connection member.

* * * * *